No. 656,893. Patented Aug. 28, 1900.
J. W. KENEVEL.
APPARATUS FOR TREATING COAL AND ORES.
(Application filed May 20, 1899.)
(No Model.) 8 Sheets—Sheet 7.
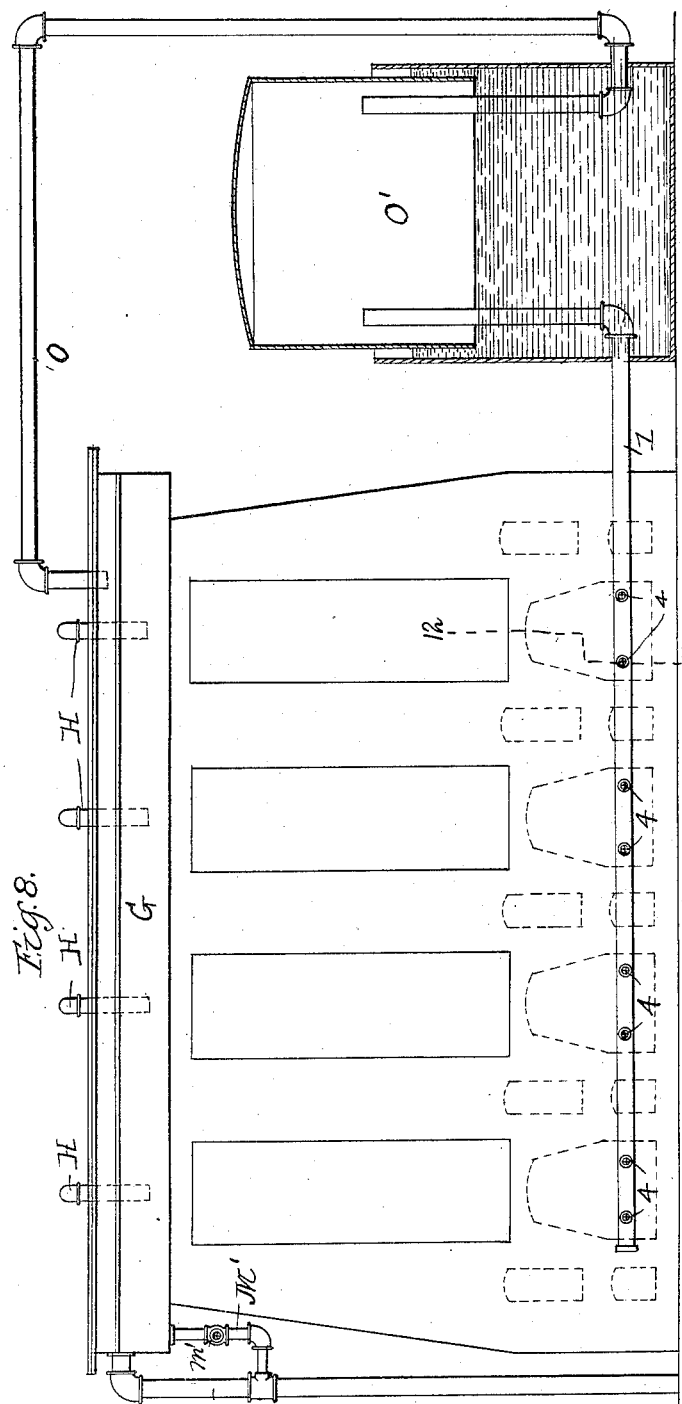
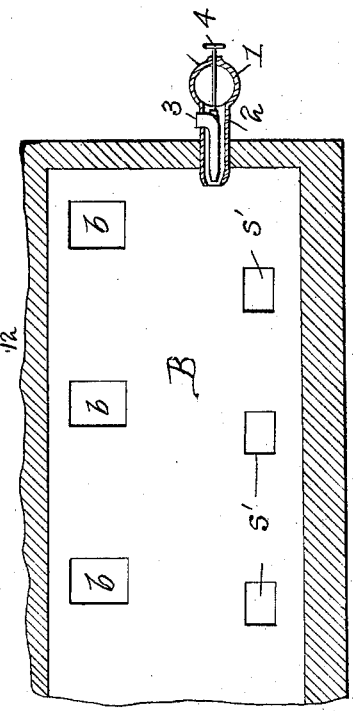
Witnesses:
Inventor No. 656,893. Patented Aug. 28, 1900.
J. W. KENEVEL.
APPARATUS FOR TREATING COAL AND ORES.
(Application filed May 20, 1899.)
(No Model.) 8 Sheets—Sheet 8.

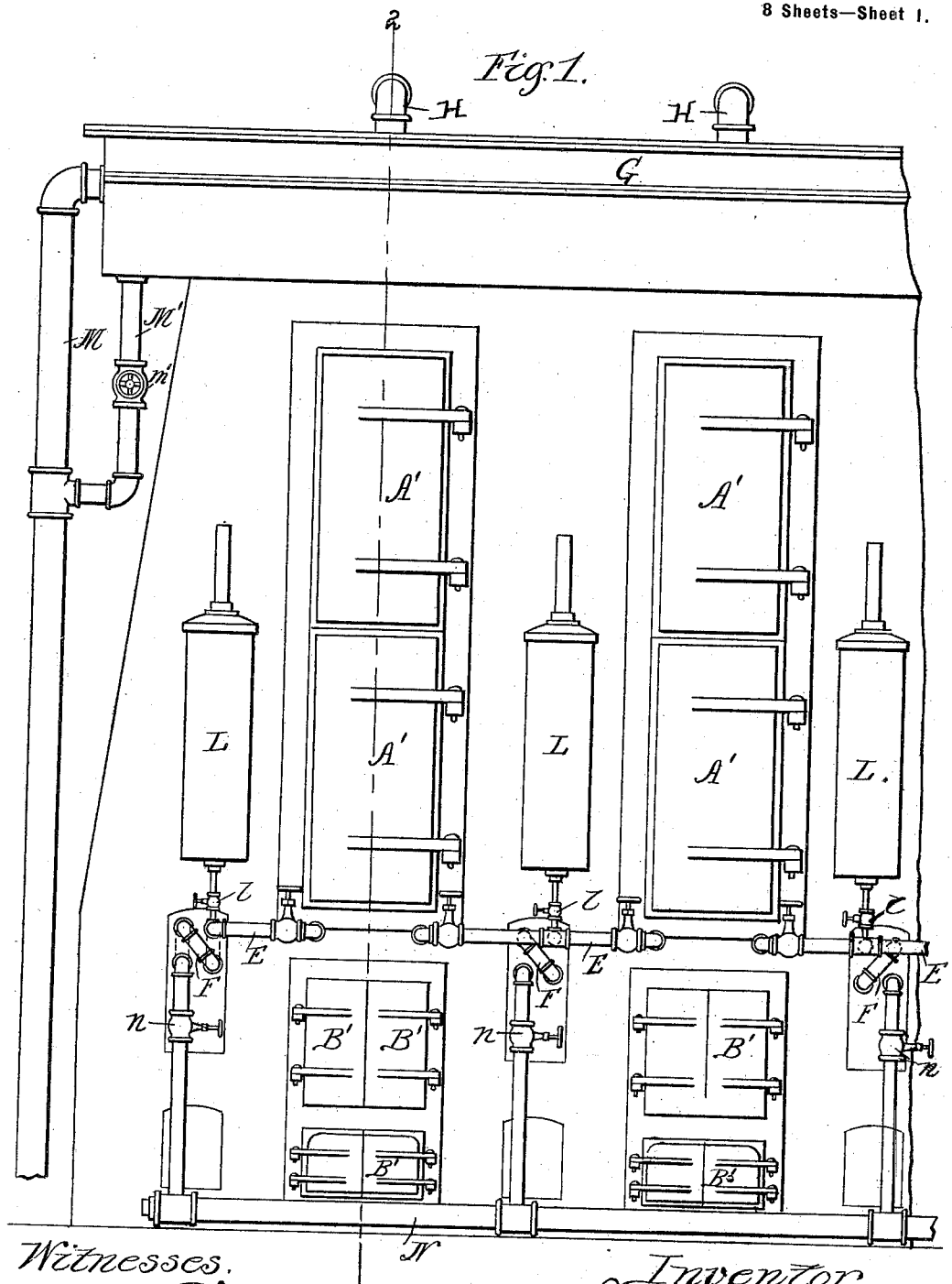

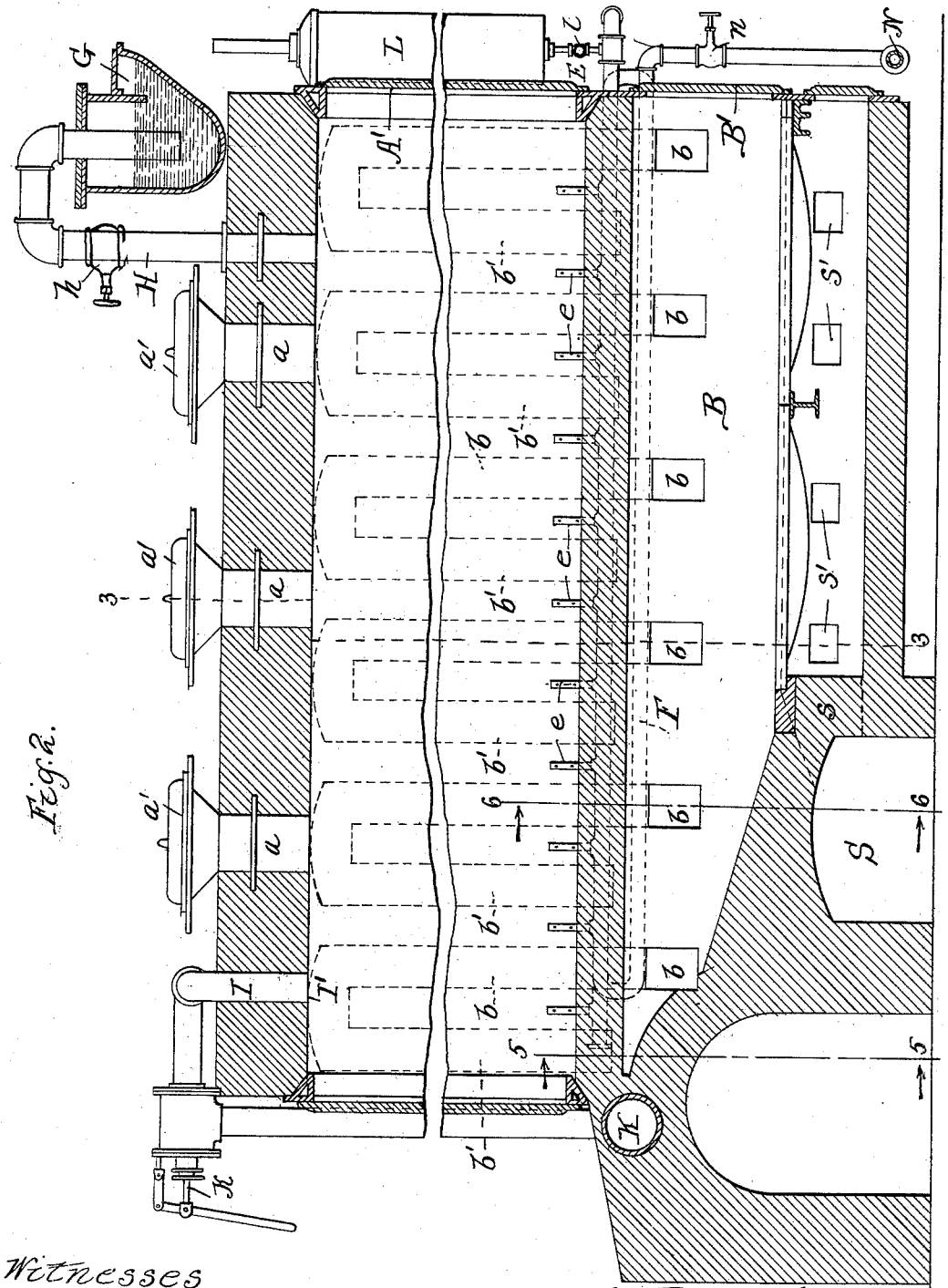

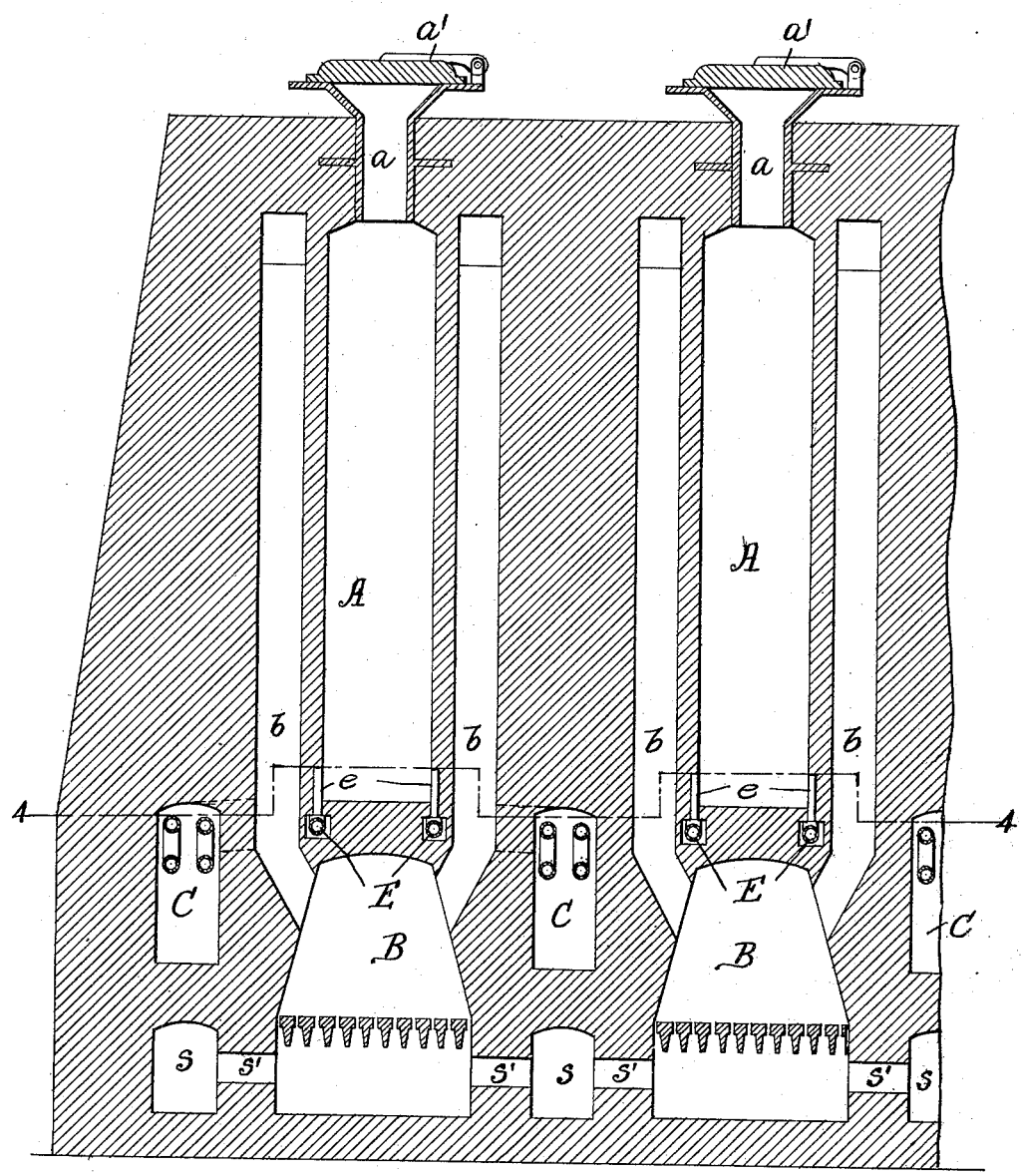

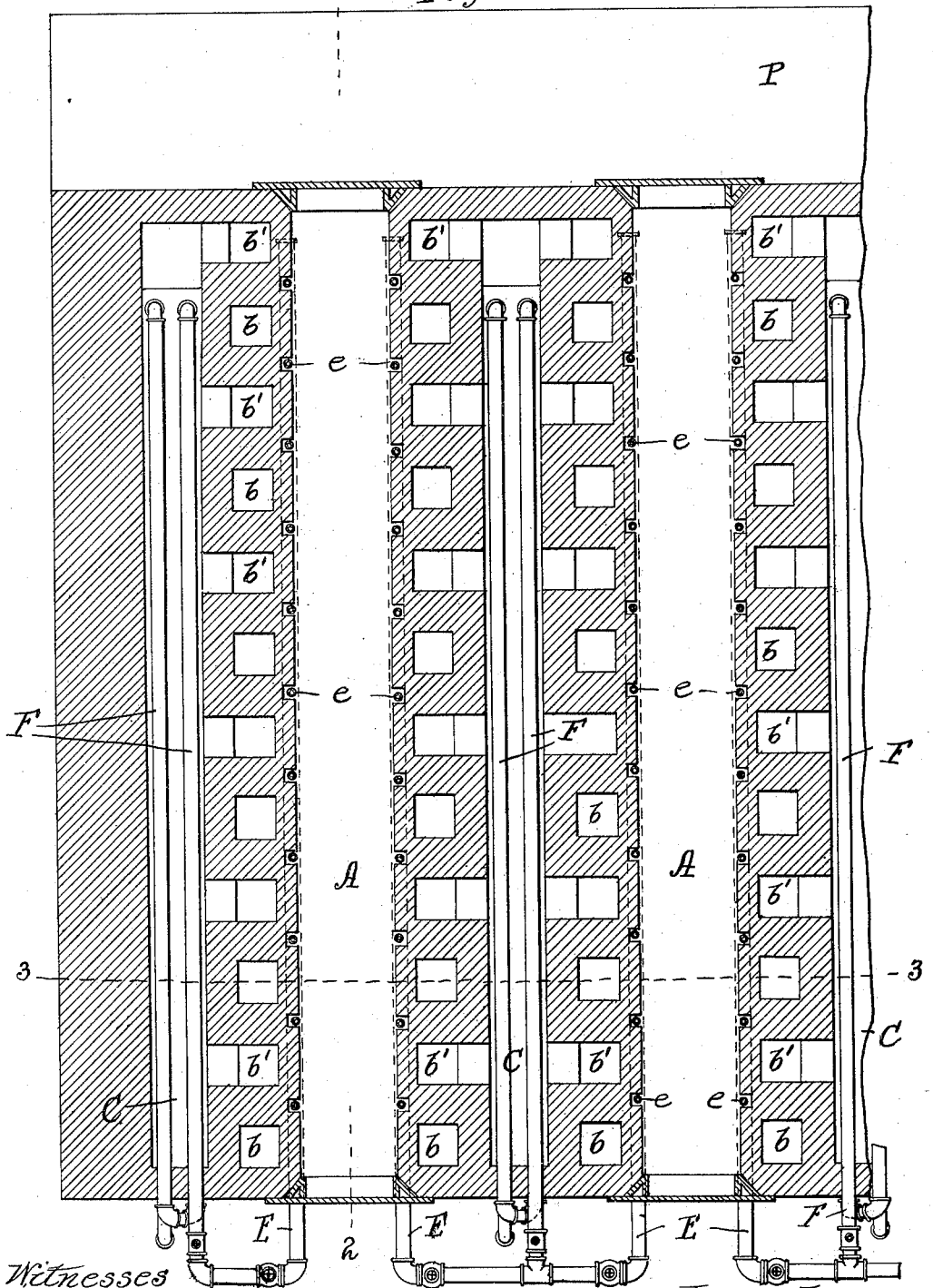

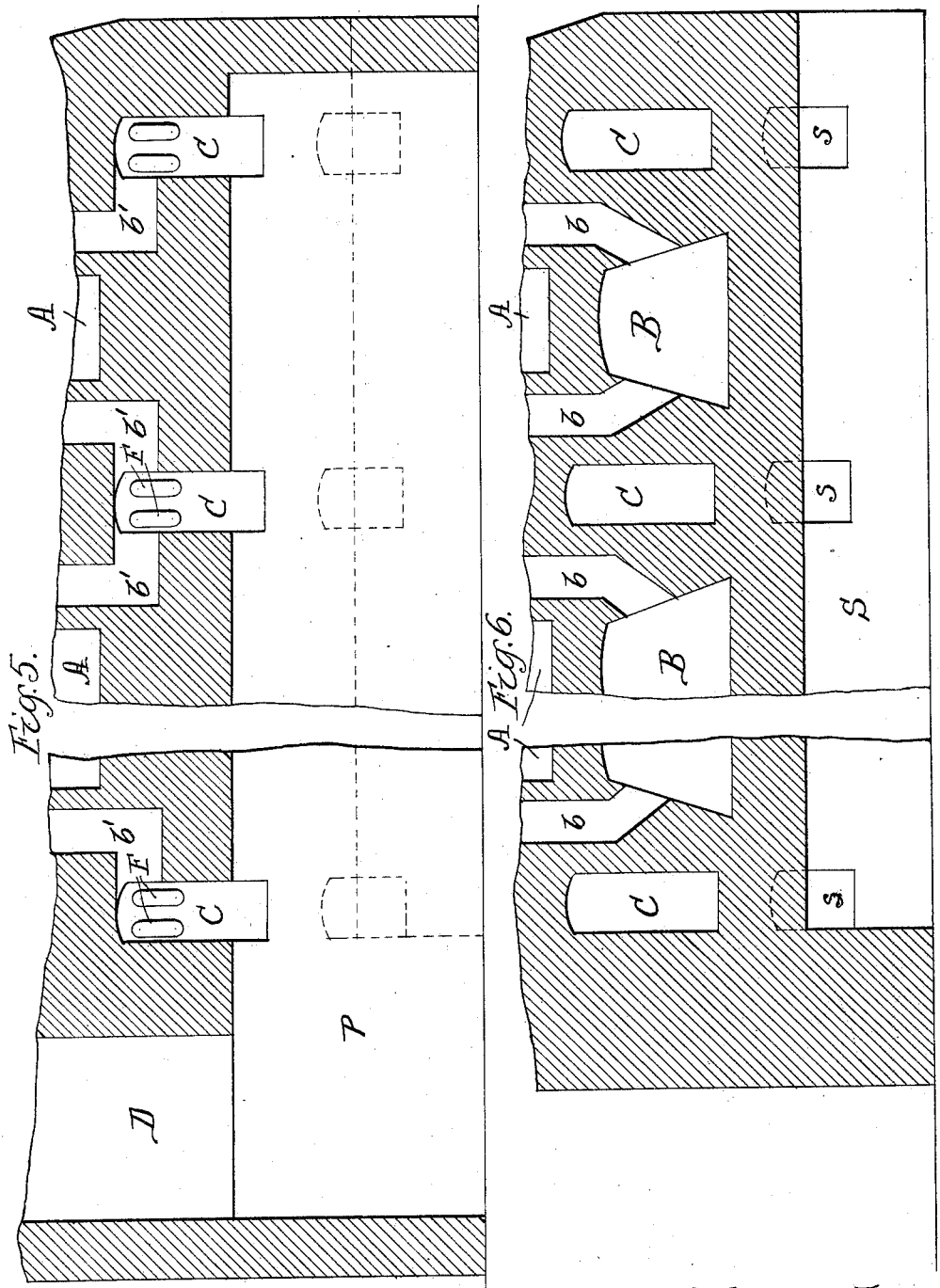

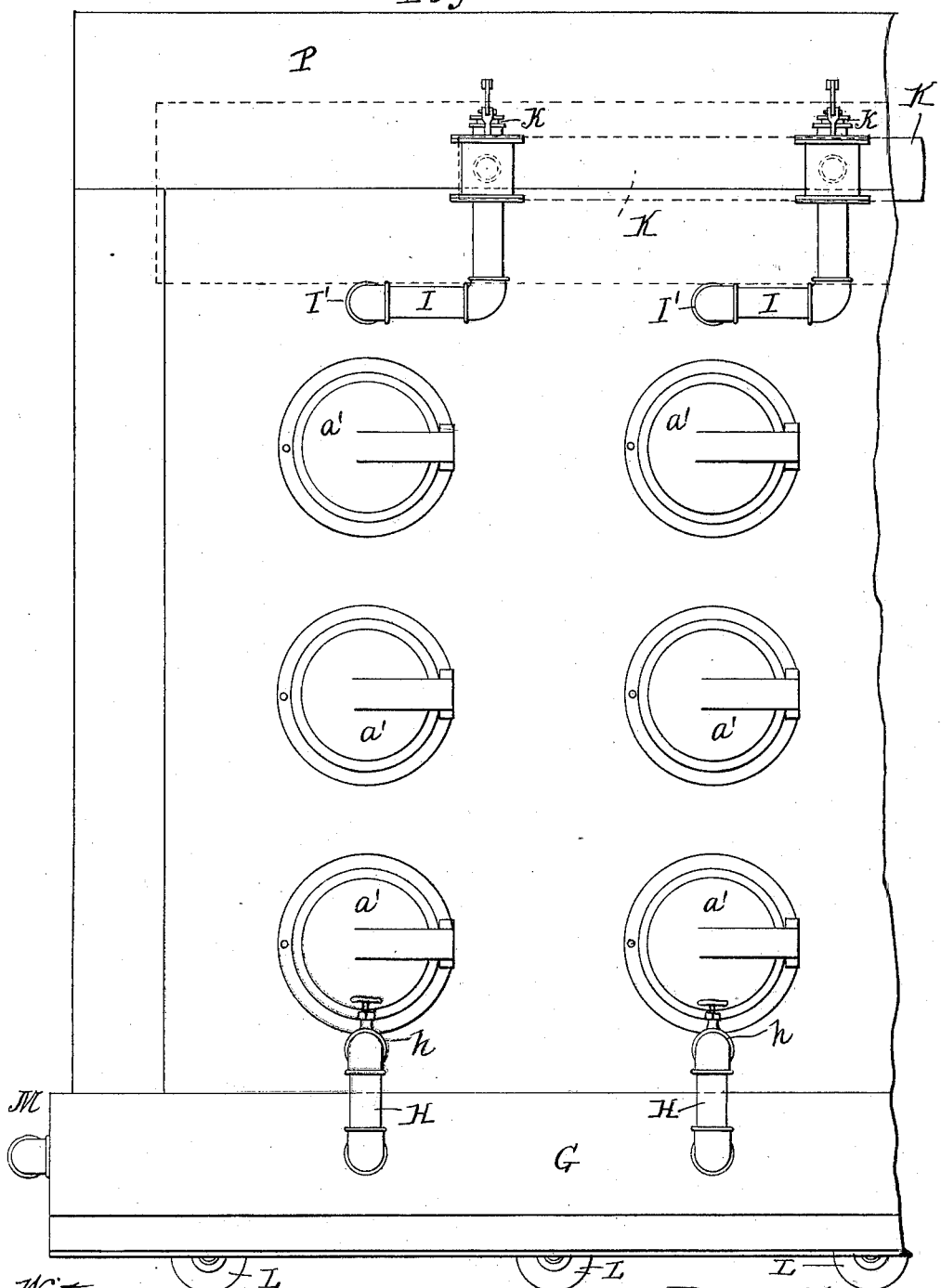

Witnesses
Inventor

UNITED STATES PATENT OFFICE.

JEANNOT W. KENEVEL, OF CHICAGO, ILLINOIS, ASSIGNOR TO THE TENNESSEE COAL, COKE AND BY PRODUCT COMPANY, OF HARRIMAN, TENNESSEE.

APPARATUS FOR TREATING COAL AND ORES.

SPECIFICATION forming part of Letters Patent No. 656,893, dated August 28, 1900.

Application filed May 20, 1899. Serial No. 717,637. (No model.)

*To all whom it may concern:*

Be it known that I, JEANNOT W. KENEVEL, a citizen of the United States of America, residing at Chicago, in the county of Cook, in the State of Illinois, have invented certain new and useful Improvements in Apparatus for Treating Coal and Ores, of which the following is a description.

Figure 9:
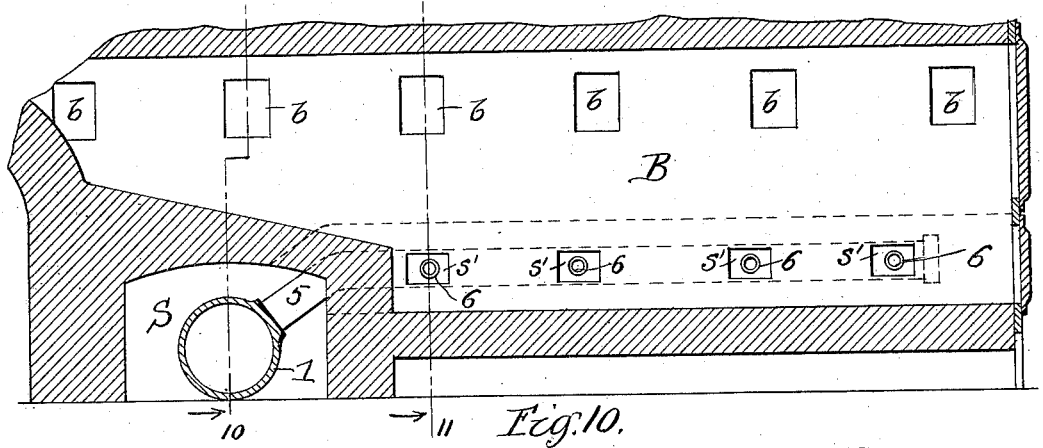
Figure 10:
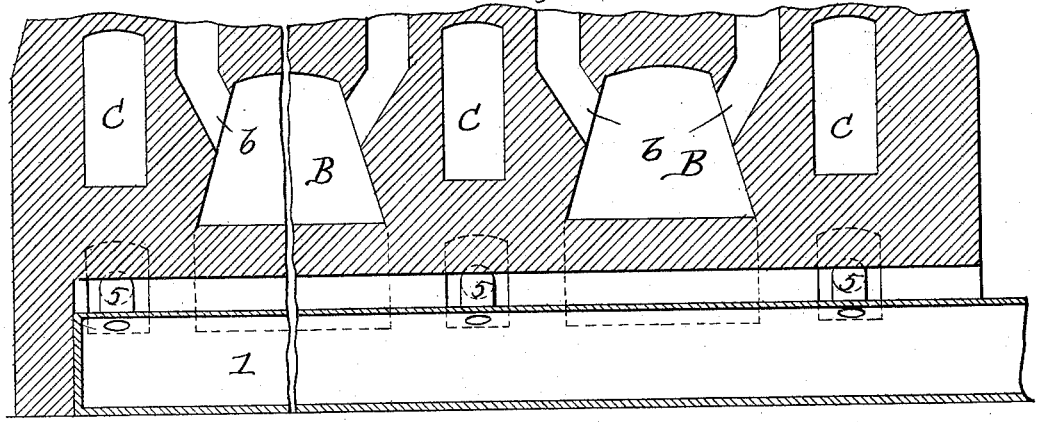
Figure 11:
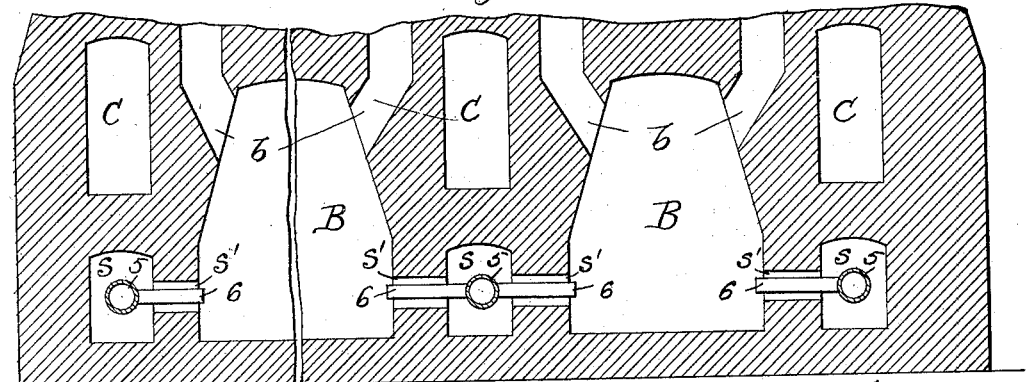

Referring to the accompanying drawings, wherein like reference-letters indicate like or corresponding parts, Figure 1 is a partial front elevation of my improved apparatus. Fig. 2 is longitudinal vertical section in line 2 2 of Figs. 1 and 4. Fig. 3 is a transverse vertical section in line 3 3 of Fig. 2. Fig. 4 is a horizontal section in line 4 4 of Fig. 3. Fig. 5 is a transverse vertical section in line 5 5 of Fig. 2. Fig. 6 is a similar section in line 6 6 of Fig. 2. Fig. 7 is a partial top plan. Fig. 8 is an end view of the apparatus, showing the gas receiver and connection. Fig. 9 is a sectional view showing one way of arranging the gas pipes and burners. Fig. 10 is a section in line 10 10 of Fig. 9. Fig. 11 is a similar section in line 11 11 of Fig 9, and Fig. 12 is section in line 12 12 of Fig. 8.

The object of my invention is to produce an effective and economical apparatus for the treatment of coal and ores and for the elimination of sulfur, phosphorus, or other metalloids therefrom.

To this end it consists in the novel construction and combination of the apparatus shown and described, and particularly pointed out in the claims.

In the drawings, A A, Fig. 2, represent retorts into which coal or ores may be charged through openings *a a*, which are provided with sealing caps or covers *a' a'*.

B B are combustion-chambers arranged to permit the products of combustion to escape through flues *b b* to heat the retorts A, Figs. 2, 3, and 4. As will be seen, the flues *b b*, Figs. 2 and 3, are provided with return-bends *b' b'*, Fig. 2, which aid in heating the retorts and deliver the products of combustion to the superheating-flues C, Fig. 4, and thence to the flue P, leading to a stack D.

Each retort A is provided with means for forcing steam, air, or other gases through the charge. The pipes E serve this purpose, and to facilitate this action in a thorough manner they are preferably provided with a plurality of jets *e e*, arranged along the pipes for this purpose, Figs. 2, 3, and 4. Within the superheating-flues C in the preferred construction are arranged pipes F, connecting the air, gas, or steam pipes E with a suitable steam-generator, (not shown,) if steam be used, or with an air or gas supply under suitable pressure if such be used. The passage of the products of combustion from the chambers B through the flues *b b'* will thus primarily heat the retorts A, and in passing through the flues C also superheat the steam, air, or gases passing through the pipes F, in which condition I prefer to inject it into the charge.

G is a hydraulic main of well-known construction connected to the retorts A by the pipes H. If preferred, a plurality of such mains may be employed, but by suitably positioning the main, as shown, one is usually sufficient. Other pipes I connect the discharge-ports I' of the retorts A with one or more suitable discharge-pipes K, by means of which the gases from the retorts may be permitted to escape without passing through the main G. Suitable valves *h k* control the flow through the pipes and direct the discharge of the gases and volatile elements through the main G or the pipe K, Fig. 1, as desired.

S, Fig. 1, is an air-flue preferably extending transversely across the apparatus and constructed to freely admit the exterior air thereto. For this purpose one or both ends are preferably partially or wholly open.

*s s* are longitudinal flues extending from the flue S parallel to the chambers B and provided with ports *s' s'*, leading into the combustion-chambers, Figs. 2, 3, 5, and 6. This construction admits atmospheric air to the chamber B to insure perfect combustion. The several flues may be and preferably are so positioned as to heat the inflowing air to a marked extent, which is a decided advantage in the rapid treatment of the charge.

L L are receptacles for containing a liquid which it is desired to deliver into or through the charge with the current of steam, air, or other gases at or during some stage of its treatment. For this purpose the tanks or receptacles L are so arranged that when desired the contents may be regularly delivered under the control of suitable valves *l* into the steam or gas pipes E at some point between the source of supply of the steam or gas and the point of delivery with the charge at the jets *e*. By this means the liquid becomes thoroughly vaporized and incorporated with the passing steam or gas, and is thus uniformly and evenly distributed through the charge. The liquid I have preferably employed has been an acid solvent of sulfur or phosphorus, and by injecting said solvent, as described, at the proper time I am enabled to free the resulting product of a larger percentage of those undesirable metalloids than is possible by the means usually employed.

The overflow from the main G may pass off by the pipe M.

M' is a pipe connecting the bottom of the main with the overflow-pipe M, whereby the main may be drained when desired. A valve *m'* controls the drain M'.

N is the main steam, air, or gas pipe, furnishing a supply to the pipes F in the several flues C of the battery.

*n n* are valves controlling the admission of steam, air, or gas to any of the series of retorts.

Means are provided for the removal of the charge from the retorts. The doors A' A' facilitate this. The combustion-chambers are also provided with doors B' B'.

The preferred mode of operation as thus described is as follows: The retorts A are charged with coal or ores, and all openings being closed the fires are then started in the combustion-chambers B. The products of combustion passing along the sides of the retorts through the flues *b b'* primarily heat the retort, thence passing through the flues C superheat the steam, air, or other gases in the pipes F, thence passing into the flue P, finally escaping by means of the stack D. The rising temperature in the retorts causes the release of the gases and volatile elements from the charge. The chemical action attending the release of the said gases and elements has the effect of increasing the temperature, accelerating the process. The escaping gases and volatile elements pass through the pipes H into the main G, where the by-products may be secured in the manner now well known. The gases are thus washed and may then be conducted by the pipe O to the receiver O'' for use or be permitted to escape, as preferred. After the richer part of the gases and volatile elements have been thus secured and the temperature raised to a suitable point (preferably from 1,500° to 2,100° Fahrenheit) the valve *h* is closed and the valve *k* opened. The steam, air, or other gases is then turned on and escapes through the pipes E and jets *e e* into the charge, and being under suitable pressure for the purpose forces its way through the charge, carrying the released metalloids therewith out through the port I' and the pipe K. To facilitate the more perfect elimination of metalloids, such as sulfur and phosphorus, I prefer to inject into the passing steam, air, or other gases an acid solvent of those substances, as stated. I prefer to use acetic acid for this purpose, and find that when in the form of good commercial vinegar it is adapted for such use. The acid solvent is placed in the receptacle L and is delivered from thence into the pipes E as desired. The exact procedure here described need not necessarily be followed, though preferred as stated. Thus in some cases I prefer to discharge the steam or its equivalent into the charge at intervals, say, of five minutes each during the operation or at intervals during only a part of the operation. In some cases it may be desirable to reverse the steps as to passing the escaping gases and elements out by means of the escape-ports *l'* and pipe K or main G, and such changes are contemplated by me in treating coals or ores varying in quantity. When the treatment is completed, the charge is removed in any suitable manner. This may be done through the doors A' A'.

When the gases are stored in the receiver O'', as desired, they may be used for all the usual purposes, including the heating of the retorts A. Figs. 8, 9, 10, 11, and 12 show two ways in which this may be accomplished. In that shown in Figs. 8 and 12 the pipe 1 conducts the gas along the ends of the retorts, supplying gas to the burners 2 in the combustion-chambers B. The air-pipe 3 supplies the necessary oxygen or atmospheric air to secure perfect combustion. Valves 4 control the burners. In the preferred form shown in Figs. 9, 10, and 11 the gas supply-pipe 1 is located in the flue S, with branches 5 extending into the flues *s* to supply the burners 6, which are so located in the ports *s'* as to permit sufficient air to be admitted to secure perfect combustion. This method has a distinct advantage in the fact that the combustion is secured at a plurality of points along the sides of the chamber B and are forced inward, insuring a very perfect and equable heating of the retorts. When the latter method is employed, the grate B' may be, if desired, removed or be changed to a position where it will not interfere with the operation of the burners 6.

In using the word "steam" in the following claims I intend to be understood to include also air or other gases as above stated.

Having thus described my invention, what I claim as new, and desire to secure by Letters Patent, is—

1. In an apparatus of the kind described, the combination of a horizontally-arranged retort having means for charging and discharging the same, a combustion-chamber beneath the retort, a substantially-vertical flue communicating with the combustion-chamber and arranged at the side of the retort for heating the same, an elongated horizontal flue C located adjacent said retort and combustion-chamber and communicating by means of a return-flue with said vertical flue, a steam-heating pipe in said flue C, and connection from the same into the retort, substantially as described.

2. In an apparatus of the kind described, the combination of a horizontally-arranged elongated retort having means for charging and discharging the same, a combustion-chamber beneath the retort, an elongated horizontal flue C located adjacent said retort and combustion-chamber, a plurality of vertical flues communicating with the combustion-chamber and arranged at the side of the retort, a plurality of return-flues arranged at the side of the retort substantially the same distance therefrom as said vertical flues and communicating with said vertical flues and said horizontal flue C, a steam-pipe located in said flue C, and connection from the same into the retort, substantially as described.

3. In an apparatus of the kind described, the combination of a plurality of horizontal elongated retorts arranged side by side and having means for charging and discharging the same, a combustion-chamber beneath each retort, a plurality of horizontal flues C arranged between the retorts and combustion-chambers on a horizontal plane substantially at the base of the retorts, a plurality of vertical flues $b$ arranged at opposite sides of each retort and communicating with the combustion-chamber beneath the retort, a plurality of return-flues $b'$ communicating with the flues $b$ and arranged at opposite sides of each retort, the flues $b'$ on one side of the retort communicating with one flue C and the flues $b'$ on the other side of the retort communicating with another flue C, steam-heating pipes located in said flues C, and connection from the steam-pipes into said retorts, substantially as described.

4. In an apparatus of the kind described, the retort A, provided with means for charging and discharging the same and also with the escape-port I', the hydraulic main G, and means for directing the discharge of the gases and volatile elements from the retort through either the main or the port I', in combination with the branch gas-pipes 5 and the burners 6, arranged substantially as described, the flues $b\ b'$, the horizontal superheating-flue C, and steam-pipe located in the flue C and arranged to discharge steam in the charge in the retort at a plurality of points, substantially as described.

5. In an apparatus of the kind described, the retort A provided with means for charging and discharging the same and also with the escape-port I', the hydraulic main G, and means for directing the discharge of the gases and volatile elements from the retort through either the main or the port I', in combination with the combustion-chamber B, provided with ports $s'$, the flue S provided with branch flues with which latter said ports connect, the gas-supply pipe 1 provided with branch pipes 5, located in the flues $s$, and burners 6 arranged substantially as described, the flues $b, b'$, the superheating-flue C, steam-pipes located in said flue C and arranged to discharge steam into the retort at a plurality of points, and a fluid-receptacle arranged to deliver a fluid into the steam-pipes at will, substantially as described.

JEANNOT W. KENEVEL.

Witnesses:
JAMES E. RODES,
J. W. WILLIAMS.